United States Patent
McGinnis et al.

(10) Patent No.: US 6,384,933 B1
(45) Date of Patent: May 7, 2002

(54) JOB CONTROL IN A PRINTING SYSTEM UTILIZING OBJECT-ORIENTED MODULES IN A DISTRIBUTED OBJECT SYSTEM

(75) Inventors: Brian McGinnis, Batavia; Colin Tysoe, Palatine; Simon David Ibberson, Glendale Heights, all of IL (US)

(73) Assignee: Marconi Data Systems Inc., Woodale, IL (US)

( * ) Notice: Subject to any disclaimer, the term of this patent is extended or adjusted under 35 U.S.C. 154(b) by 0 days.

(21) Appl. No.: 09/283,103

(22) Filed: Mar. 31, 1999

(51) Int. Cl.[7] .............................................. G06K 15/00
(52) U.S. Cl. ..................................................... 358/1.18
(58) Field of Search ................................ 358/1.1, 1.13, 358/1.14, 1.15, 1.16, 1.17, 1.18; 709/249, 222; 703/13; 711/203, 200; 710/8, 9, 12, 20, 62, 64, 72

(56) References Cited

U.S. PATENT DOCUMENTS 5,550,957 A * 8/1996 Davidson, Jr. et al. ..... 388/1.15
5,815,710 A     9/1998 Martin et al.
5,838,970 A    11/1998 Thomas
5,935,217 A  *  8/1999 Sakai et al. .................. 709/249

* cited by examiner

Primary Examiner—Arthur G. Evans
(74) Attorney, Agent, or Firm—Piper Marbury Rudnick & Wolfe

(57) ABSTRACT

A printing system utilizing object-oriented modules in a distributed object system is disclosed. Particularly, a method is described for controlling a printing system using a job-oriented approach to facilitate communication between system objects. In one aspect, a plurality of print job objects are provided including a top level job control object that maps communication between the print job objects via a virtual control network. A job is then created involving the print job objects for the purpose of transferring an electronic print image to a substrate.

17 Claims, 8 Drawing Sheets

Microfiche Appendix Included
(4 Microfiche, 349 Pages)

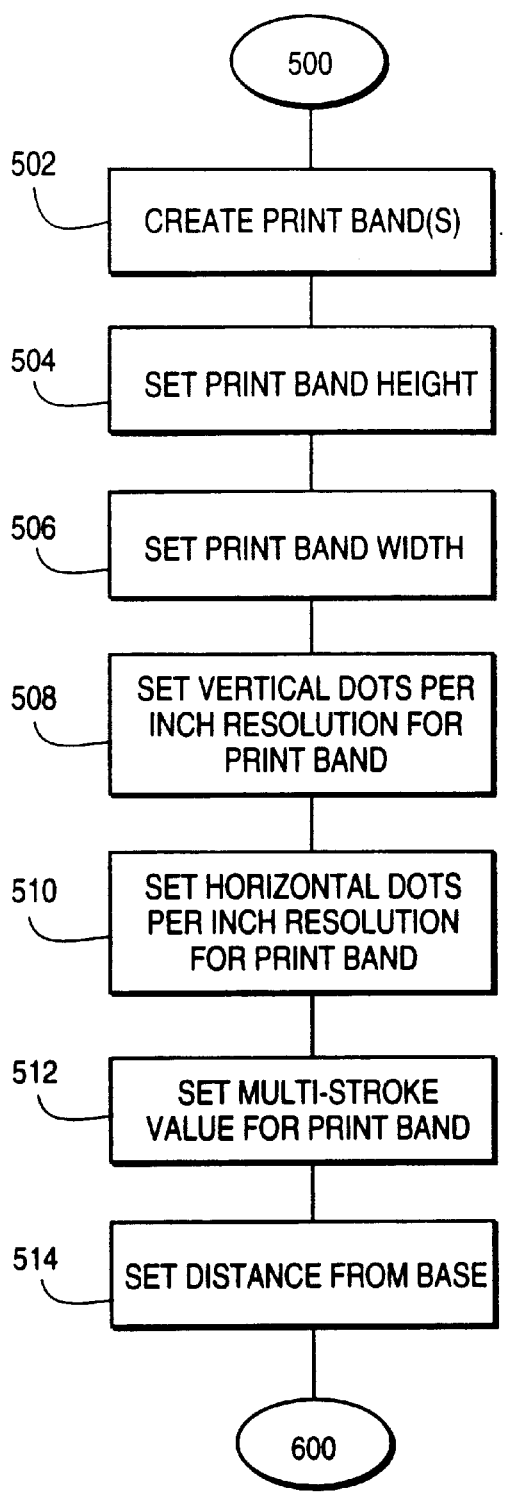
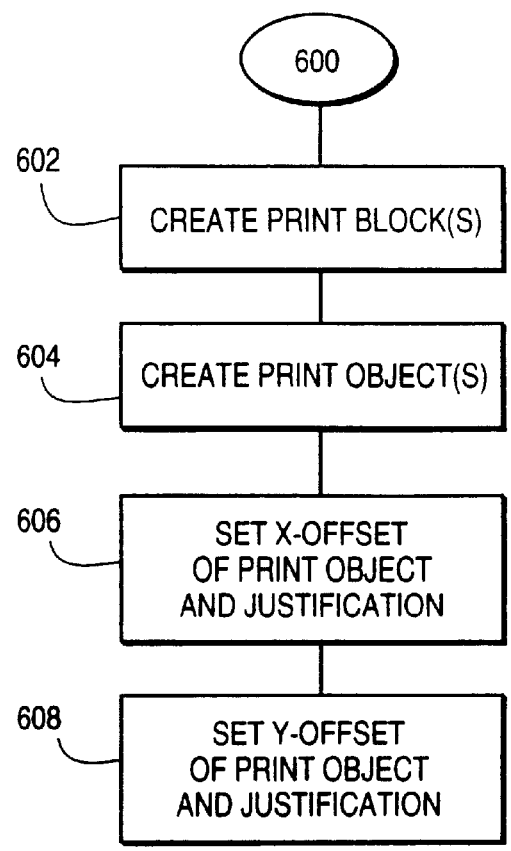
FIG. 5
FIG. 6

JOB CONTROL IN A PRINTING SYSTEM UTILIZING OBJECT-ORIENTED MODULES IN A DISTRIBUTED OBJECT SYSTEM

MICROFICHE APPENDIX

A microfiche appendix containing computer program code is included herewith. The microfiche appendix consists of 4 microfiche cards having 349 total frames.

The appendix portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. The Field of the Invention

The present invention relates to the fields of ink jet printing devices, distributed computing systems, client-server computing and object-oriented programming. More specifically, the present invention is a method to control a printer system on a virtual control network utilizing object-oriented modules in a distributed object system.

2. The Relevant Art

Problems with traditional programming techniques stem from an emphasis placed on "procedural" code that often is extremely difficult to design, update and modify. Generally, small changes in conventionally programmed code can affect all elements of the code. Thus, minor changes made to the software in response to user demands can require major redesign and rewriting of entire programs.

Object oriented programming strategies, which have become popular in recent years, tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. Object code is therefore more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly. U.S. Pat. No. 5,815,710 to Martin et al. and U.S. Pat. No. 5,838,970 to Thomas both disclose detailed descriptions of object-oriented methodologies and the general advantages of modular code for non-specific applications.

However, the full promise of object oriented methodologies in specific applications, especially the advantages afforded by their modularity, have yet to be achieved. In particular, it would be highly desirable to allow programmers and other users access to objects in a transparent fashion so that objects created and residing on different printer platforms, such as the industrial and graphic ink jet printer systems made by Video jet Systems International of Wood Dale, Ill., may be made accessible to the user without extensive modification of the user's programming code. Ink jet printers are in widespread use in addressing of mail pieces, i.e., projecting images down onto passing mail pieces, and container and package marking.

Objects in distributed systems are useful because they separate the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, calls may be made to an object about which the programmer has no detailed knowledge with the confidence that at the appropriate time the remote object will be accessed and will return its data so that the programmers code will function properly. Such a system thus maximizes the inherent advantages of object oriented methodologies by taking full advantage of their modularity and encapsulation.

To achieve such a system, the resources and components of objects in the system must be managed and controlled by one or more objects having standardized interfaces. Particularly, in the field of industrial and graphic printing, it would be desirable to create a system whereby a top level job control object is responsible for initializing jobs and serves as an interface through which other objects communicate for the purpose of transferring electronic print images to substrates.

SUMMARY OF THE INVENTION

The foregoing desired aspects and advantages are achieved in a computer implemented method for controlling a printer system for transferring images onto a moving substrate utilizing object-oriented modules communicating via a virtual control network in a distributed object system. In one aspect, the method comprises the steps of providing a plurality of print job objects where one of the print job objects is a top level job control object. The top level job control object initializes a job for the purpose of transferring an electronic print image to a moving substrate not under control of the printer system. The top level job control object also serves as an interface through which the print job objects communicate.

In another aspect of the present invention, the print job objects are created in succession.

It is another aspect of the present invention for the print object job objects to create subordinate print job objects in lower level run time modules.

Still another aspect of the present invention is for the top level job control object to store and delete jobs within the system.

Still yet another aspect of the present invention is that the top level job control object serves as the primary interface for starting, stopping, and resuming a job, and commanding all other function modules with respect to starting, stopping, and resuming jobs.

Other aspects and advantages of the present invention will become apparent when the description of specific embodiments below are read in conjunction with the accompanying figures.

BRIEF DESCRIPTION OF THE DRAWINGS

FIGS. 4–6 are diagrams of job control functions, according to a preferred embodiment of the present invention.

DESCRIPTION OF THE PREFERRED EMBODIMENT

Figure 1:
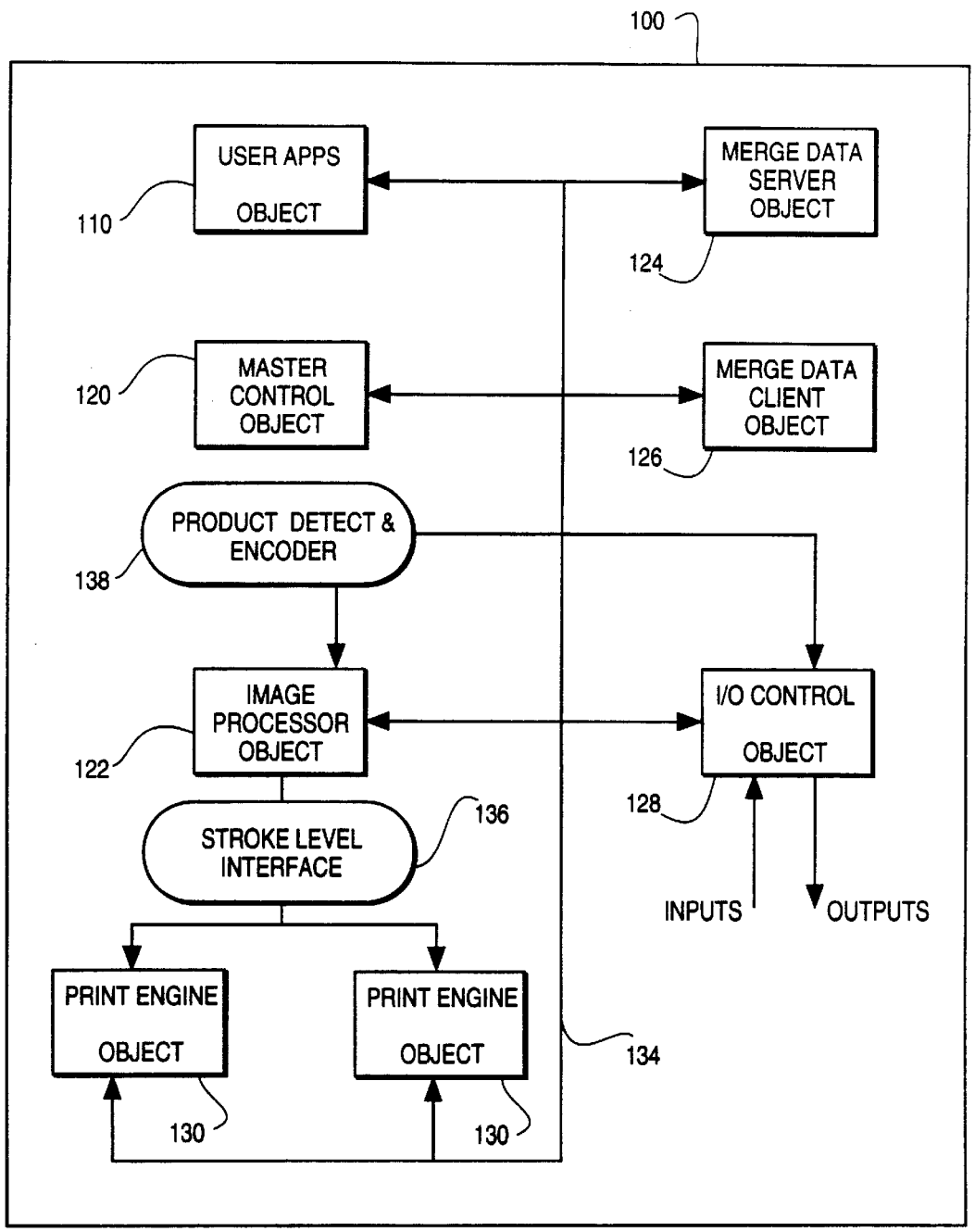
FIG. 1 is a diagram of object-oriented modules in a distributed object system to be utilized in a printer system, the object-oriented modules comprising a user application object, a master control object, an image processor object, a print engine object, a merge data server object, a merge data client object, and an I/O control object, each object being interfaced by a virtual control network, according to a preferred embodiment of the present invention.

FIG. 1 is a diagram of object-oriented modules in a distributed object system to be utilized in a printer system. The printer system 100 is for use in industrial and graphic printers of a kind known in the art for transferring an electronic print image onto a moving substrate. In the art, the substrate movement is not controlled by the printer system 100. Each distributed object in the system 100 is connected to every other object by means of a virtual control network 134 which is described further herein. This gives any object the ability to communicate with any other object regardless of where the other object is residing. The system 100 objects, which include a user application object 110, a master control object 120, an image processor object 122, a print engine object 130, a merge data server object 124, a merge data client object 126, and an I/O control object 128, and their base functionality within the system 100 are described herein.

Also represented in FIG. 1 is a product detect and encoder unit 138, of a kind well-known in the art, which typically consists of an electric eye and roller system upstream from a print head 734 (FIG. 7) for signaling the image processor object 122, thereby indicating the presence and speed of a product (substrate). Also shown is the stroke level interface 136, where real-time communication occurs between the image processor object 122 and the print engine object 130. Detail concerning the stroke level interface 136, which relates to stroke triggers and stroke data being provided to a print engine 730 (FIG. 7) in real-time, is beyond the scope of the present invention.

As used herein, the term "distributed object" or "object" refers to an encapsulated package of code and data that can be manipulated by operations specified in the interface definition of the distributed object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. Second, distributed objects are location-independent, i.e., distributed objects can be located remotely or within the same client. This contrasts sharply with traditional programming objects which typically exist in a single address space: the address space of the client. Distributed objects can be object-clients or object servers, depending upon whether they are sending requests to other objects or replying to requests from other objects. Requests and replies are made through an object request broker (ORB) that is aware of the locations and status of the objects.

A preferred system architecture for implementing such an ORB is provided by the Common Object Request Broker Architecture (CORBA) specification. The CORBA specification is defined by the Object Management Group (OMG), a consortium of vendors including Sun Microsystems, Incorporated, Digital Electronics Corporation, Hyperdesk Corporation, Hewlett-Packard Corporation, SunSoft, NCR Corporation and Object Design, Incorporated. Under the CORBA, a distributed object system is defined in terms of a client-server model wherein target objects, or servers, provide services to clients that request such services.

I. User Application Object

Referring to FIG. 1, user application object 110 encompasses the external interfaces to the printer system 100. A particular user application may be part of the actual printer system 100 itself or may reside external to and be interfaced with the printer system 100. An application may consist of one or more graphical user interfaces or may consist entirely of translation programs that automatically create print jobs based on external inputs. In the preferred embodiment, sub-functions of user application object 110 include laying out of print information, mapping and conversion of generic print descriptions into standardized job descriptions, setup and configuration of dynamic objects, a set clock/date sub-function, an input of I/O rules sub-function, an input description of the physical setup sub-function and a run-time terminal sub-function. The laying out of a generic print description involves the creation of a print job based on user inputs from a user interface. The generic print description is a format that is non-specific to any particular printer technology and completely defines what needs to be printed for a given print job. There may be more than one type of print description based on the type of printer application being defined. The mapping and conversion of a generic page description into a standardized job description as part of a user application allows different printer products to have various external data formats specific to that printer application. The job description is the commonly defined set of data that completely defines all the details of a print job. The job description data model is the same for all printers and is part of the common data mode. The setup and configuration of dynamic objects refers to those items that may change value from product to product. These include serializer inserts, clock inserts, and merge data inserts. The definition of these inserts may occur in the same user application or a file translator that is used after a page is laid out. The set clock/date sub-function is required to set the system time that will be used for any defined clock inserts or control logic. The input of I/O rules sub-function provides a means for defining any specific I/O conditions or actions that need to occur during a print job. The input description of the physical setup of the printer system may be part of the page layout process or may be an independent application. This involves describing the physical state of the printer and associating that description with a print job. The run time terminal sub-function is responsible for displaying any run-time print status to the user.

II. Master Control Object

The sub-functions of the master control object 120 can be broken into two categories, system control and job control. System control is primarily responsible for managing those resources and data components that are used by the rest of the system. In the preferred embodiment, these include status monitoring, system diagnostics, configuration management, and a font server sub-function. Status monitoring and logging involves not only the collection of status events from the rest of system 100 but also acting on events if necessary. For example, stopping or halting the printer on notification of a line failure. System diagnostics provides a means of extracting and maintaining diagnostic information on the entire system 100, while the configuration manager is responsible for matching subsystem versions to insure that the right hardware and software version are installed and cooperating. Part of the translation from job description to run job description involves the conversion of a font description into a font stencil or bitmap. This conversion is performed by job control and then embedded in the run job description data model. The font stencil is used when "pasting" a print image together.

Job control is the primary interface for creating and maintaining jobs within the system 100. A job is the high level description containing all the pages, configuration, and other information needed to print a desired message. Jobs can be created, stored, and deleted. Jobs can be transferred between printers of the same configuration, thus a job created on one system will be able to print on another. This includes the ability to create jobs offline and then download them to a printer via a LAN or other type of network. Jobs are also storable on various mediums such as diskettes. Jobs can contain multiple pages that are mapped to the different faces of a substrate or pages that are selected individually.

Job control is also the primary interface for starting, stopping, and resuming a print job, and commanding all other function modules with respect to starting, stopping, and resuming print jobs. Job control also provides the primary interface for changing those job parameters which can be modified during runtime.

Figure 2:
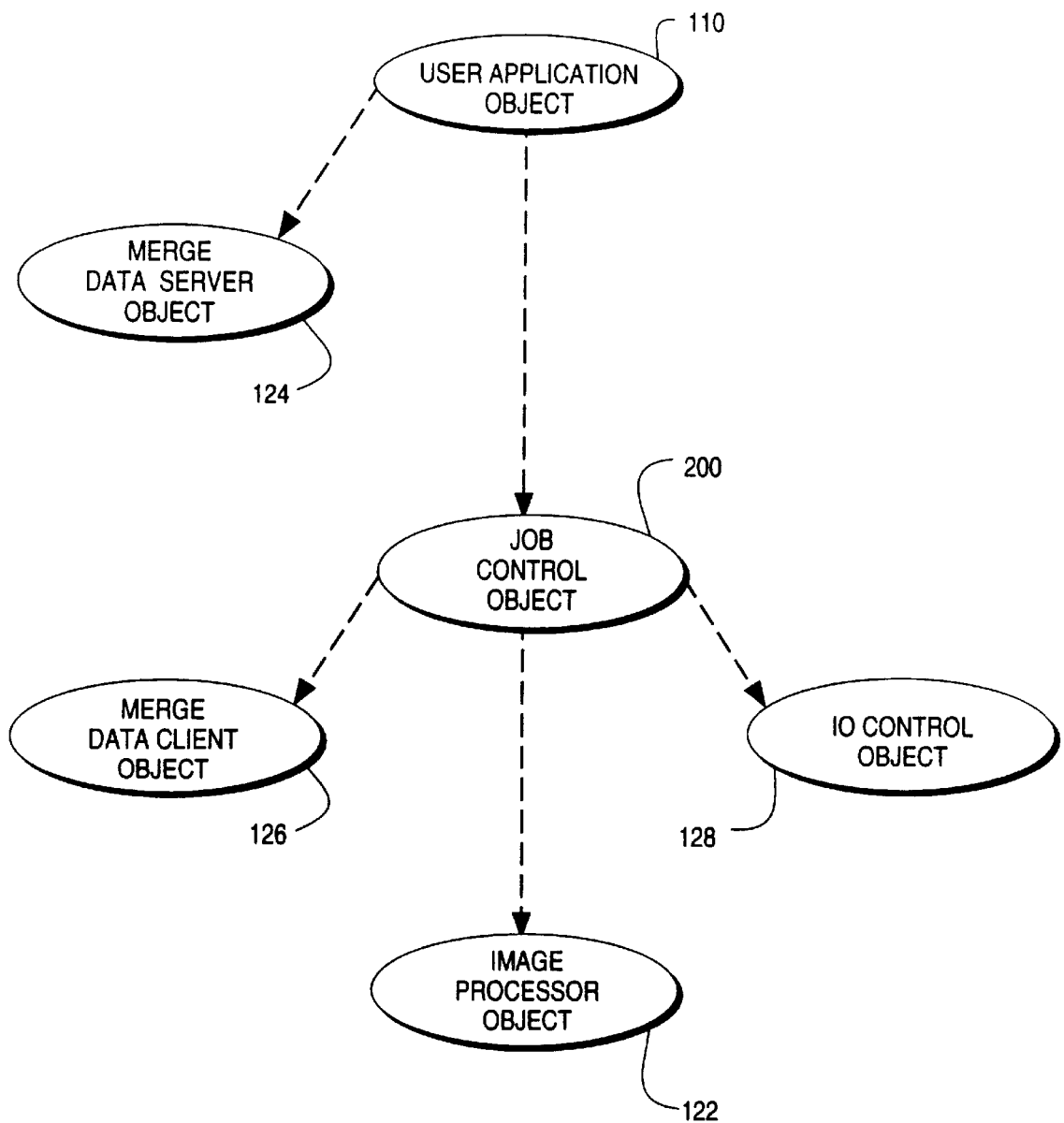
FIG. 2 is a diagram illustrating the general relationship between job control and other system objects, where job control is a sub-function of the master control object in FIG. 1, according to a preferred embodiment of the present invention.

As illustrated in FIG. 2, job control 200 provides a single interface to a user application 110 for the specification and creation of jobs. In the preferred embodiment, job control 200 is not responsible for storing and retrieving jobs from a storage device. Instead, the storing and retrieval functionality is provided by merge server object 124. Job control 200 does however provide the necessary functions to create and destroy jobs. When destroying jobs, job control 200 is sensitive to the current state of the job, i.e., is the job printing or halted. Job control 200 will also guard against attempts to destroy jobs that are currently in use. Job control 200 is also responsible for the translation and distribution of the job into the other functional blocks and the primary interface point for running a print job. A job description created in job control 200 or by another object is the high level set of data that completely defines a print job including what is to be printed (run job), where external data is to be obtained (data job), and what I/O rules (I/O control job) to execute. The job description data model is similar for all printers. The run job, data job, and I/O control job are the common data models for the image processor 122, merge data client 126, and I/O control 128 objects, respectively. When a print job is started, job control 200 is responsible for taking the information contained within the job description and creating the data sets for each print job object. The other objects then use the specific job data to accomplish the objects specific task. Thus, each object is required to only know about that information which is pertinent to its own specific task.

Once a job has been created and loaded to initialize other system components, such as the image processor 122, job control 200 serves as an interface through which print job objects of other system components can communicate. In this manner, an application or other system component can create a job in job control 200 and then control that job via references obtained from job control 200 during the job creation/setup process without requiring direct access to other objects. A top level job control object defined in job control 200 serves as the standardized interface for communication between print job objects.

Figure 2A:
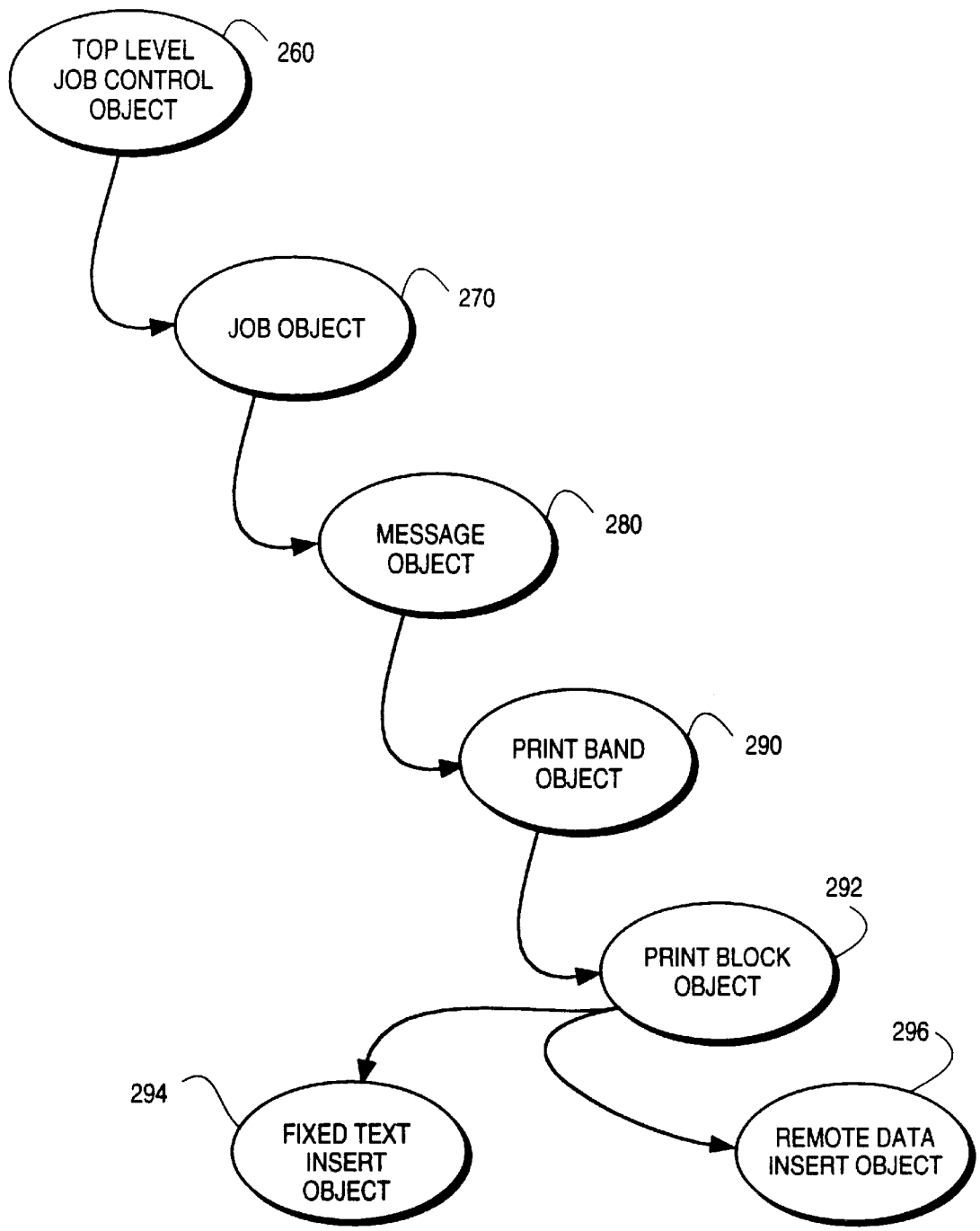
FIG. 2A is a diagram illustrating the mapping relationship between a top level job control object defined in job control and other print job objects that control and define print jobs, according to a preferred embodiment of the present invention.

FIG. 2A is a diagram illustrating the mapping relationship between the top level job control object 260 and its subordinate print job objects defined in job control 200: job object 270, message object 280, print band object 290, print block object 292, fixed text insert object 294 and remote data insert object 296 that comprise the entire job. The relationship between jobs, messages, print bands, print blocks and inserts are detailed further herein. Each subordinate object represents an encapsulation of the data associated with a particular aspect of the image that needs to be printed. In this way the job data is decomposed into several constituent objects with each object containing reference to sub-objects that further detail the job. At the leaf nodes of a job are the most basic inserts, depicted in FIG. 2A as fixed text insert object 294 and remote data insert object 296. These basic inserts contain all the properties that are necessary to define and generate a requested image.

Figure 2B:
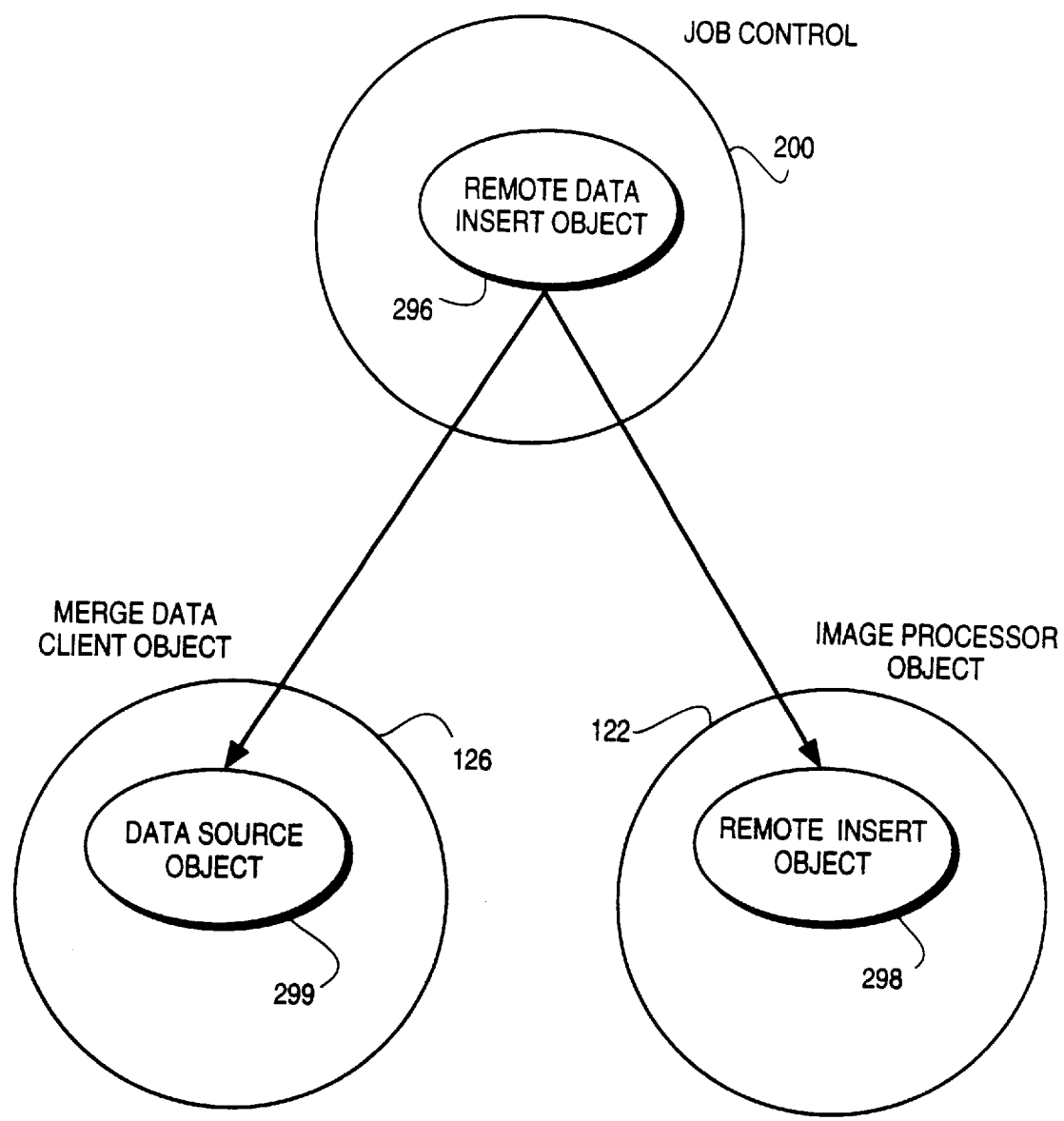
FIG. 2B is a diagram illustrating one print job object creating two subordinate print job objects in lower level modules.

When a job is initialized through the top level job control object 260, each sub-object in succession creates one or more subordinate objects in the lower level runtime modules: image processor 122, I/O control 128, and merge data client 126 (see FIG. 2). These subordinate objects contain only the subset of the properties of the higher level object that created them. These subsetted properties are only those that are needed to operate in the respective runtime module. For example, the remote data insert object 296 contains both the general position and font properties of all inserts as well as the baud rate and parity of the serial port from which it reads the remote data. As shown in FIG. 2B, when initialized, this remote data insert object 296 will create two subordinate objects, one in the image processor space 122 referred to as the remote insert object 298, and the other in the merge data client object 126 space referred to as the data source object 299. The image processor 122 subordinate object will only contain those properties which are pertinent to operation of the image processor, i.e. position and font type. The merge data client 126 subordinate object on the other hand will contain only the baud rate and parity information, which are the only pertinent properties required by merge data client's 126 operation. Furthermore the higher level remote data insert object defined in job control 200 will link these two subordinate objects together such that the proper flow of data will occur between them.

It is by this mechanism of job definition that the pertinent and necessary data is defined in one place in the job control 200 module. Furthermore, this centrally defined data is then selectively propagated down to the runtime modules where it is used to generate the printed images. Access to the lower level subordinate objects is achieved primarily through the top level control object. In the previous example, any changes to the state of the remote data insert such as clearing the serial buffer would be achieved through an invocation of the job control defined remote data insert object 296 and not by any calls to the subordinates. This results in a clearer and simpler interface than would exist if changes had to be made directly to the image processor and merge data objects.

Figure 4:
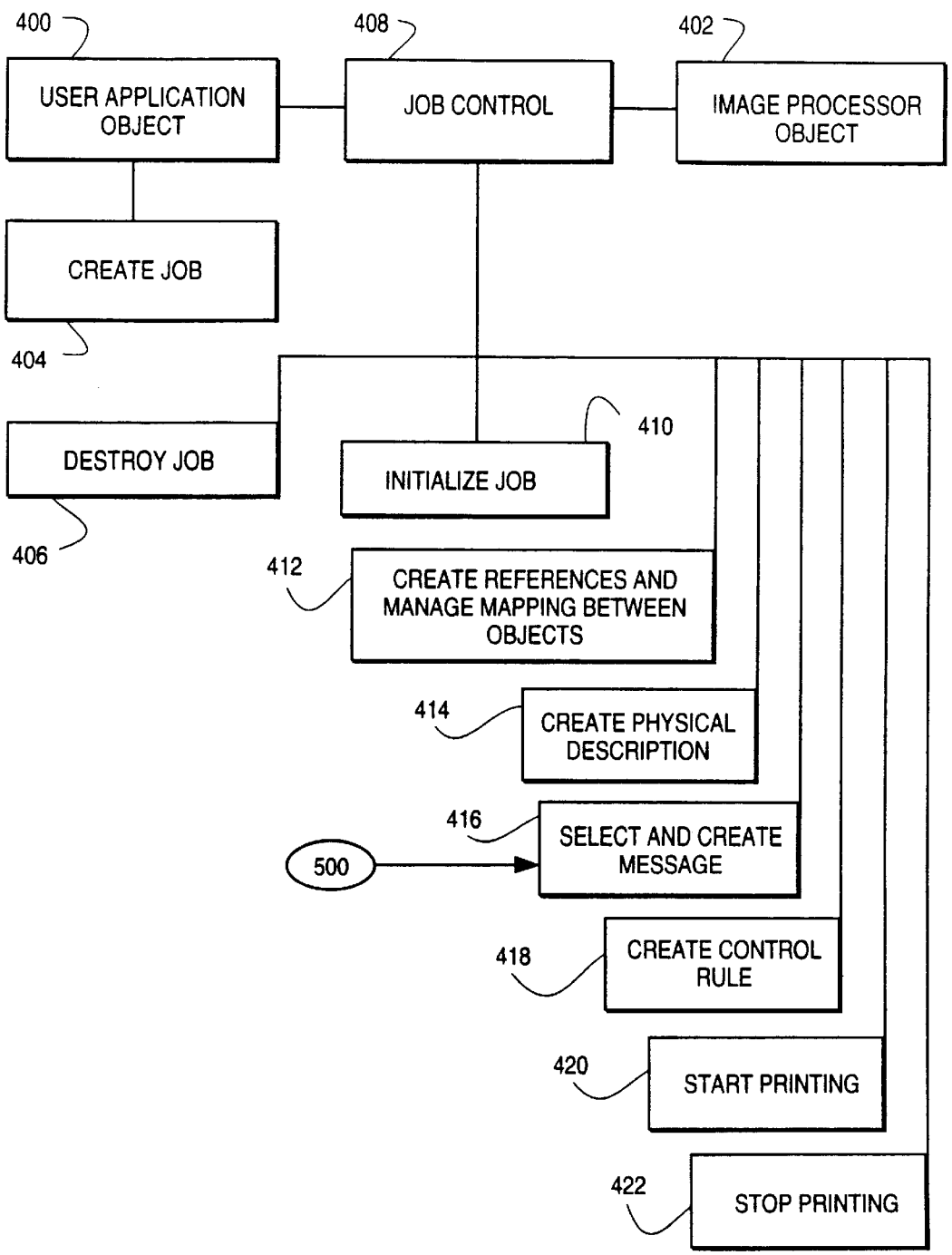

FIG. 4 is a diagram illustrating job control functions where user application object 400 creates a job at block 404 and where job control 408, which is a sub-function of the master control object 120 (see FIG. 1) initializes the job at block 410. As shown in FIG. 4, there is no direct link between the image processor object 402 and the user application object 400. Instead upon creation of a job at block 404, job control creates reference variables to map communications between print job objects defined in user application object 400 and image processor object 402 as described at block 412. Accordingly, the image processor object 402 interacts with other system objects and responds to other objects by communicating through job control 408. Job control 408 can also destroy jobs as described at block 406.

For the job created at block 404, job control 408 creates a physical description, selects and creates messages to be printed, and creates control rules for selecting additional messages during printing as described at blocks 414, 416 and 418, respectively. Job control 408 also controls functions such as start printing and stop printing, as described at blocks 420 and 422, respectively.

The physical description defines the page layout and content of the inserts, i.e. dates, serializers, etc., to be printed on a product. A page is the contiguous area of a substrate upon which print blocks are placed. A page may have one or more print bands associated with it, where the print band is an area on a page that can be marked by one or more print heads. Pages are mapped to a specific face and location on a substrate. When a page is moved, all of the contained print blocks move in accordance with the page. Pages can be duplicated or repeated per product detect, thereby providing a matrix like printing operation. The selection of a specific page to be printed can also be triggered by variable data changes or external I/O input.

Figure 7:
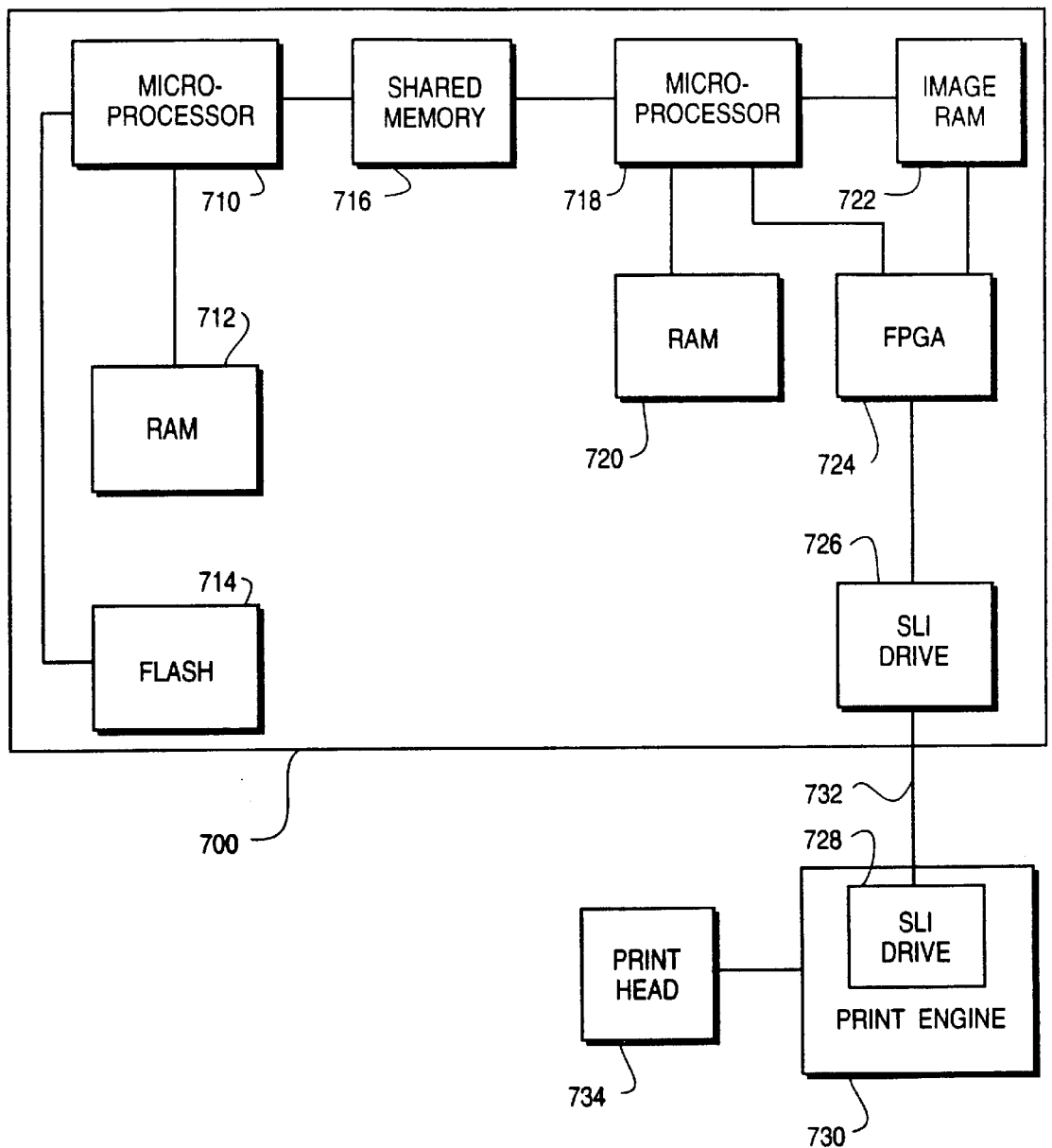
FIG. 7 is a diagram of the hardware in a printer system that utilizes the object-oriented modules of FIG. 1. according to a preferred embodiment of the present invention.

Referring to FIGS. 4 and 5, for each message selected and created as described at block 416, one or more print bands is created as described at block 502. Creation of a print band involves setting print band height, setting print band width, setting the vertical dots per inch resolution for the print band, setting the horizontal dots per inch resolution for the print band, setting the multi-stroke value for the print band and setting the distance from a base reference point for both the print band and associated print heads as described at blocks 504–514, respectively. Setting the distance from the base for a print band enables the relative position of a print head associated with a print band to be determined. Each print band may be related to one or more print heads 734 (FIG. 7). More, specifically, a print band is the contiguous printing area defined by one or more print heads. In the preferred embodiment, the maximum continuous width of a print band is 1 meter at a horizontal resolution of 100 dpi. This maximum defines the allowable area in which print can be placed.

Referring to FIG. 6, for each print band one or more print blocks are created at block 602. A print block defines an area of the print band in which created print objects, as described at block 604, may be placed. Print blocks can be moved and copied within a page as long as the print blocks are contained within the defined print bands. Print blocks have property values that can affect the print objects contained therein. A print block, for instance, can be defined to support text wrapping for its print objects; that is the text will wrap within the confines of the block based on variable data specified by contained inserts. An entire print block can also be marked as inverted, bolded, reversed or rotated. Print blocks also have fixed width and height dimensions. Each x-y coordinate position designated in a print block is specified relative to the bottom left-hand corner of the print band. Print objects within the print blocks can be positioned independently in the x-y directions relative either to the print block in which they reside or relative to other print objects within the same print block. When specifying the position of a print object in the x-direction, reference is made, as described at block 606, to an off-set from either the left or right edge of the object the print object is related to. Placement of a print object in the y direction is similarly referenced, as described at block 608, as an offset from either the top or bottom edge of the object the print object is related to. The x and y offsets define points of reference for the print object. Justification of the x-offset allows the left edge or right edge of the related print object to be placed at the point of reference. Justification of the y-offset allows the top edge or bottom edge of the related print object to be placed at the point of reference. The center points between the left and right edges, and the top and bottom edges may also be placed at the point of reference.

A print object is the basic building block of a printed message. Each print object has its own set of properties which define the fonts and styles, and ways in which these fonts and styles are printed. Print objects are placed within a specific print block and located either relative to other print objects or absolutely to the owning print block. There are several common properties that can be defined for all classes of print objects, including:

Font—the font can be selected from the set of installed fonts or barcode formats.

Invert—the entire print object can be inverted.

Reverse—the entire print object can be reversed.

Bolderized—varying levels of boldness can be applied to the entire object.

Rotation—all the characters/graphics within the print object can be rotated at various degrees to allow various print methods.

Fixed height and width—the height and width of a print object can be fixed by the user otherwise the dimensions of the object will grow and shrink depending on font, style, and content of the print object.

Print objects may consist of fixed text, fixed graphic, variable text or variable graphic information. Fixed text is the simplest type of print object, defining a non-varying text string which is printed the same per product detect. As with all print objects, the location of the text may be dependent on the length or location of another print object. Accordingly, although the content of the fixed text print object may not change, the location of the print object on a substrate may change. Fixed graphic print objects behave similarly to fixed text except that the contents are in the form of a graphic image as opposed to a character string. With the exception of font selection, all normal print object properties can be applied. The importing of industry standard graphic formats is supported in the preferred embodiment so that users may print graphics that are designed in popular graphics software packages. Variable text print objects contain a set of text strings of which only one is printed per product. The selection of which string to print can be controlled by a serializer value, remote data value, merge data value, or by some other external I/O value. Variable graphic print objects contain a set of graphic images of which only one is printed per product. Images contained in variable graphic print objects can be selected in the same fashion as variable text strings.

A print object defines both the type of data to be printed and the display format for that data. Also, print objects designate different inserts that may be added to an image, each insert defining data and format attributes. For example, an insert may define time data and/or date data and the color format for the data. Shift inserts specify shifts during which different inserts may be printed. Serializer inserts will sequence through a user definable character set in user definable increments and may be printed per product detect.

A print object of type string will have an associated representation that determines how the string will be displayed. The associated representation allows any insert, be it a serializer insert, a data insert, or a remote data insert, to generate font specific alphanumeric representations and bar code representations of the string generated by the insert.

Strings designated as variable-sized may change from product to product and may offer dynamic sizing of the insert to accommodate the text or justification of the text within a fixed size insert. Also, insert characteristics may be selected independently with respect to x and y directions. For instance, an insert could grow and shrink in height (the y-direction) but maintain a fixed width with center justification regarding the x-direction.

III. Image Processor Object

Referring to FIG. 1, the primary function of the image processor object 122 is to create or "paste together" the print image during runtime and to generate that image to print engine object 130 after receiving a product detect signal. This involves the setting of insert values, the determination of the variable objects location, and the pasting of information from those objects onto the image overlay.

The image processor object 122 manages queued images that will be transferred to a substrate based on the product detect and encoder unit 138. The number of queued images is a function of system memory and image size. The image processor object 122 includes a component that fetches and manages sets of merge data from the merge data client object 126. The management and access of font and image stencils is handled in a real-time manner, with the image processor object 122 maintaining and manipulating all clock and serializer inputs defined for a given print job.

IV. Print Engine Object

In the preferred embodiment, the print engine object receives vertical stroke information and stroke triggers from the image processor object 122 and then uses technology specific techniques to transfer the desired image to the substrate. The print engine object 130 is also responsible for maintaining any technology specific functionality that may be related to the type of printer involved. Using the defined stroke level interface 136, the print engine object 130 accepts the vertical stroke information and then prints that stroke when it receives the stroke trigger. Of course, other printing methods could be used without departing from the scope of the present invention. For example, another printing method, well-known in the art, would involve the steering of a laser beam according to vector and step-data supplied by an external application or a system object.

V. Merge Data Server Object

The merge data server object 124 is the module responsible for accessing in native form any external data input devices. The merge data server object 124 includes all user defined databases regardless of access method or type. The merge data server object 124 includes all flat file access whether local or remote. This includes accessing any external hardware devices as well as their device drivers.

VI. Merge Data Client Object

The merge data client object 126 provides the merge data to the image processor object 122 for each printed product. The merge data client object 126 accesses data from the merge data server object 124 and performs any translations that are necessary. Based on the requirements of a particular printer implementation, the merge data client object 126 will queue up some of its data in advance in order to more rapidly respond to the image processor object's 122 data request. Again, based on a particular implementation, the merge data client 126 may need to translate the data from the source medium to a more common form recognized by the image processor 122. The merge data client 126 is responsible for providing a mechanism by which to mark, store and recall failed print attempts so that they may be easily reprinted.

VII. I/O Control Object

The I/O control object 128 module controls all interfaces to input and output control devices. The I/O control object 128 provides a command and status interface to any particular devices that it controls or regulates and is responsible for tracking the position of products both upstream and downstream from the printer. This allows the system to set switch gates for sorting based on data changes in the print job. Additionally, the I/O control object 128 performs jam detection, notifying the rest of the system when a jam or line error condition occurs.

VIII. Virtual Control Network

The virtual control network 134 (VCN) is the primary interface between the various objects defined in the present invention. The VCN 134 is defined by a common protocol layer and the individual interfaces for each functional object. In the preferred embodiment, the common protocol layer and the individual interfaces are standardized meaning each functional object can be designed, implemented and tested independently, thereby increasing the re-use potential of each object.

The individual component interfaces will be based on both the common data model, and the specific requirements for each object. The individual interfaces will define a base set of commands and status events that each object must comply with. The individual interfaces must also be defined such that additions and extensions to each object's interface can occur easily, without affecting the rest of the system. This will allow object interfaces to evolve as needed, but still maintain a base functionality and will promote the reuse of objects when defining printer systems.

In the preferred embodiment, the primary function of the common protocol layer is to provide a consistent and transparent mechanism by which each functional component can send command and status information to all of the other functional objects. This common protocol layer works effectively across varying operating systems and hardware platforms and is independent of low level transport layers such as standard TCP/IP and shared memory layers. This independence allows different functional objects to work in different systems without the user being required to understand the specific implementation of various objects of the different system.

Figure 3:
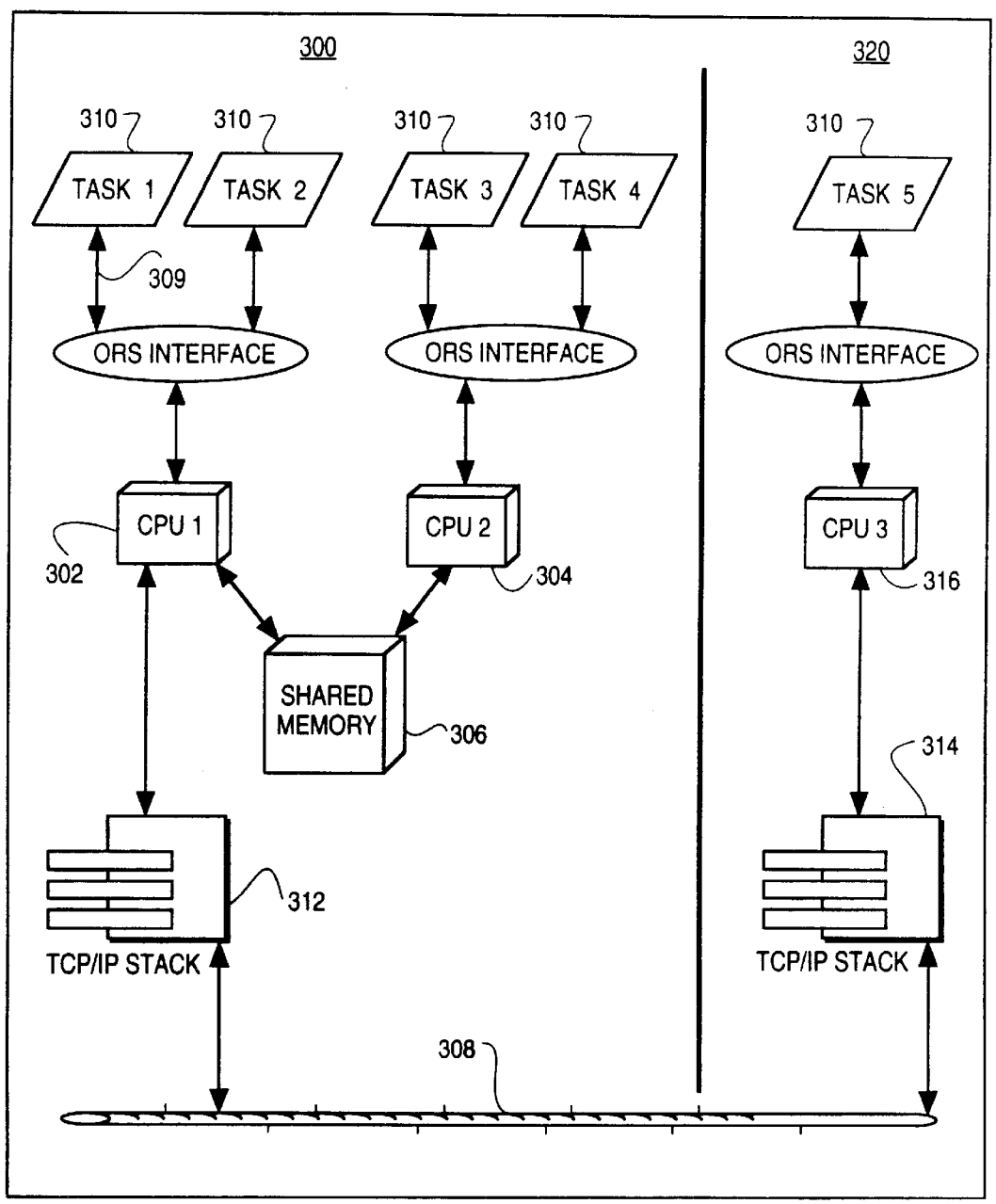
FIG. 3 is a diagram of the common protocol layer components of the virtual control network in FIG. 1, the common protocol layer being the communication channel that connects the object-oriented modules, according to a preferred embodiment of the present invention.

In FIG. 3, two printer systems 300 and 320 are shown at the common protocol layer level. Printer system 300 includes a CPU 302 and a CPU 304. CPU 302 and CPU 304 have shared memory 306 between them and the two printer systems 300 and 320 are connected through a standard Ethernet connection 308. Printer system 320 includes a CPU 316. The protocol layer resides between a plurality of individual tasks 310 and the respective CPUs. When any task makes a request or issues a status to another task, it is performed by means of the common protocol layer. The common protocol layer determines where the target task is located and then uses the appropriate underlying low level transport mechanism, here TCP/IP stacks 312 and 314, to get the message there. The common protocol layer at the receiving end then interprets the message and invokes the appropriate command in the target task. Table 1 explains how messages are transferred from task to task in the system shown in FIG. 3.

TABLE 1

| Path | Routing Strategy |
| --- | --- |
| Task 1 to Task 2 | The message from Task 1 is routed directly through the operating system on CPU 302 to Task 2, where invocation takes place. |
| Task 1 to Task 3 | The message from Task 1 is translated into a shared memory segment and written to shared memory 306 between CPU 302 and CPU 304. The segment is then read and translated by CPU 304. The message is then routed to Task 3, where invocation takes place. |
| Task 1 to Task 5 | The message from Task 1 is routed through the TCP/IP stack 312 resident on CPU 302 down to the Ethernet connection 308. This is then sent via the hard wire connection to the TCP/IP stack 314 resident on CPU 316. The message is translated up the stack to the protocol layer on printer system 320 and the appropriate invocation occurs in Task 5. |

The common protocol layer is the means by which functional components can universally communicate with each other. It is also the means by which externally interfaced systems can be integrated into the system of the present invention. In the preferred embodiment, the common protocol layer is the well-known CORBA standard.

FIG. 7 is a block diagram of a printer system 700 that utilizes the object-oriented modules defined by the present invention. Generally, microprocessor 710, a Motorola Power PC 821 in the exemplary embodiment, controls the communication and operations that occur between the various objects and has associated with it ram device 712 for executing module code and flash ram device 714 for storing the executable code of the modules, font information and other job-related data. Microprocessor 718, a Motorola 68322 microprocessor in the exemplary embodiment, also controls communication and operations that occur between the various objects and has associated with it ram device 720 for executing module code, image ram device 722 for pasting together print images and field programmable gate array (FPGA) device 724, a device well-known in the art. Microprocessors 710 and 718 have a shared memory device 716 for implementation of the virtual control network 134 (FIG. 1). The system 700 is coupled to a print engine 730 via the stroke level interface 732 which in the exemplary embodiment is a stroke level interface point to point (SLIPP) protocol. The stroke level interface 732 is supplied by five low voltage differential signals. The stroke level interface 732 connection points between the system 700 and the print engine 730 are represented in FIG. 4. as SLIPP drive 726 and SLIPP drive 728, respectively. The print engine 730 drives the print head 734 in accordance with information provided by the print engine object 130 (see FIG. 1).

Although certain embodiments and examples have been used to describe the present invention, it will be apparent to those of skill in the art that various changes can be made to the embodiments and examples without departing from the scope or spirit of the invention.

What is claimed:

1. A method for controlling a printer system for transferring images onto a moving substrate utilizing object-oriented modules communicating via a virtual control network (VCN) in a distributed object system, the method comprising the steps of:

providing a top level job control object to initialize a job for the purpose of transferring an electronic print image to a moving substrate not under control of said printer system;

providing a plurality of print job objects that define and control said job, said top level job control object being one of said plurality of print job objects; and said top level job control object also serving as an interface through which said print job objects communicate.

2. The method of claim 1 wherein said print job objects are created in succession.

3. The method of claim 1 wherein a print job object defined in one module creates a subordinate print job object in another module.

4. The method of claim 1 further comprising the step of said top level job control object stopping said job.

5. The method of claim 4 further comprising the step of said top level job control object resuming said stopped job.

6. A method for controlling a printer system for transferring images onto a moving substrate utilizing object-oriented modules communicating via a virtual control network (VCN)in a distributed object system, the method comprising the steps of:

providing a print job object;

said print job object providing a print object; and transferring an electronic print image to a moving substrate which is moving not under control of said printer system, said electronic print image being defined by said print object.

7. The method of claim 6 further comprising the step of defining a print band area on a page of said substrate.

8. The method of claim 7 further comprising the step of setting a resolution for said print band.

9. The method of claim 7 further comprising the step of setting a multi-stroke value for said print band.

10. The method of claim 7 further comprising the step of setting a distance from a base reference point for said print band and a print head.

11. The method of claim 7 further comprising the step of creating a print block for said print band.

12. The method of claim 11 further comprising the step of positioning said print object in said print block.

13. The method of claim 6 further comprising the step of positioning said print object independently with respect to horizontal and vertical reference points.

14. The method of claim 6 further comprising the step providing said print object with a fixed string size characteristic.

15. The method of claim 6 further comprising the step providing said print object with a variable string size characteristic.

16. The method of claim 6 further comprising the step of providing said print object with a fixed graphic characteristic.

17. The method of claim 6 further comprising the step of providing said print object with a variable graphic characteristic.

* * * * *